US007255819B2

(12) United States Patent
Lee

(10) Patent No.: US 7,255,819 B2
(45) Date of Patent: Aug. 14, 2007

(54) METHOD OF MANUFACTURING GAME BALL

(76) Inventor: Sung-Yull Lee, 7-1, Jukkok-ri, Jinyeong-eup 621-801, Kimhae, Gyeongsangnam-do (KR)

( * ) Notice: Subject to any disclaimer, the term of this patent is extended or adjusted under 35 U.S.C. 154(b) by 342 days.

(21) Appl. No.: 11/081,178

(22) Filed: Mar. 16, 2005

(65) Prior Publication Data

US 2005/0159258 A1 Jul. 21, 2005

Related U.S. Application Data

(63) Continuation of application No. PCT/KR02/02050, filed on Nov. 4, 2002.

(51) Int. Cl.
*B29C 44/02* (2006.01)

(52) U.S. Cl. ....................................... 264/45.3; 264/54

(58) Field of Classification Search .............. 264/45.3, 264/54
See application file for complete search history.

(56) References Cited

U.S. PATENT DOCUMENTS

| | | | |
|---|---|---|---|
| 4,144,297 A * | 3/1979 | Tomar | 264/45.5 |
| 4,529,200 A | 7/1985 | Miller et al. | 273/60 B |
| 4,568,083 A | 2/1986 | Miller | 273/60 B |
| 6,261,499 B1 | 7/2001 | Okeke et al. | 264/242 |

OTHER PUBLICATIONS

PCT/KR2002/002050 International Preliminary Examination.

* cited by examiner

*Primary Examiner*—Allan R. Kuhns
(74) *Attorney, Agent, or Firm*—Tuchman & Park LLC

(57) ABSTRACT

Disclosed is a process for producing the baseball or softball for child, for exercise and for toy that has good security characteristics and similar playing characteristics to a conventional game ball. The invention provides the process of manufacturing a game ball wherein products with the same appearance as the conventional baseball can be obtained at a time by injecting, pressing and foaming the material of EVA alone or blend thereof. Thus, the process can decrease a danger of the ball currently used in the Little League greatly and provide a process of producing the game ball for child, exercise and toy that displays the uniform pattern and playing characteristics and has the high productivity.

2 Claims, No Drawings

METHOD OF MANUFACTURING GAME BALL

This application is a continuation of International Patent Application No. PCT/KR2002/002050 filed on Nov. 4, 2002.

FIELD OF THE INVENTION

The present invention relates in general to a process for manufacturing a game ball. More specifically, this invention relates to a process for producing a game ball that has good safety characteristics with similar playing characteristics to a conventional game ball and that can be used as a baseball or softball, etc. for child, for exercise and for toy.

BACKGROUND ART

In general, a game ball such as baseball or softball is composed of an inner core, an intermediate layer and an outer skin.

The inner core is made from kapok or cork, and the outer skin has the form of two-piece covers made of leather, rubber or vinyl, which was stitched with each other.

The intermediate layer has a form where yarn or thread is wound around the core in order to keep sound, elasticity and strength upon hitting against a bat.

In this conventional game ball, tearing of the cover and breaking of the wound thread can occur as the number of use of the game ball increases. Also, the core cannot keep the proper circle form.

In addition, since the thread, cork or kapok is apt to absorb moisture, the conventional ball, when it's wet with foreign substances, is likely to decrease in strength or to distort.

Also, where baseball players play with the conventional baseball of a weight defined in the regular league, it is so dangerous that the player, in particular children, can receive a fatal wound. Therefore, there have been continued requirements for a baseball having good safety characteristics.

Some manufacturers have attempted to produce a single ball or a ball of 2- or 3-layer construction, using polyurethane or thermoplastic copolymer blend materials.

The ball made of polyurethane foam has some defects. That is, it has too high elasticity and thus, on hitting, it flies so far that it can be dangerous to the player. Also, in producing this ball, it is difficult to control polyurethane foaming within a mold and thus to obtain a uniform spherical ball.

In order to keep the uniform circular form of the game ball, in some manufacturers, methods were attempted, in which instead of winding with yarns or threads, ionomer or thermoplastic resin blend materials are injected into the form of hemispheres and two of the hemispheres are fused on the core.

However, these ball-manufacturing methods involve a complex process and require many costs. For these reasons, there have been demands for a new method of manufacturing a ball, which can keep uniformity of products and reduce production costs.

DISCLOSURE OF INVENTION

Accordingly, the present inventors have conducted a study in an attempt to develop a producing method of game balls capable of overcoming various problems occurring in the prior game ball and the producing method thereof, and consequently invented a producing method of game balls game ball for child, exercise and toy, which have remarkably reduced danger as compared to balls currently used in the Little League while exhibiting a uniformly circular form, playing characteristics, and high productivity.

Therefore, an object of the invention is to provide a method of manufacturing a game ball, which allows production of the game ball having the same appearance as the conventional baseball, in one shot, by injection press foaming of a compound material of EVA alone or blends thereof.

Hereinafter, the method for manufacturing game ball in accordance with the present invention has been illustrated and described in detail with reference to examples below.

That is, the invention concerns the process of manufacturing a game ball by injection press foaming, wherein the compound material of EVA alone or blends thereof is injected into a mold which is then pressurized for a desired period of time at the temperature at which the compound material can be crosslinked and foamed. Then, entrapped foaming gas is diffused on opening of the mold, thereby producing the ball in one shot.

Since the injection press foaming process allows uniform control of temperature and pressure, so that the foaming gas is uniformly diffused upon opening of the mold, and thus the complete spherical ball can be obtained in one shot.

The method for manufacturing ball by injection press foaming can be composed of three procedures as follows, namely, mold design, material compounding and injection working. These procedures will now be described in more detail.

(1) Mold Design

First, a mold having a size reduced to a determined size is designed in such a manner that the compound material will have the same shape and size as the actual ball when the material is foamed.

That is, the foaming magnification needs to be selected in consideration of weight, strength, sound and safety, etc. that are characteristic required in a game ball.

If the foaming magnification is too high, strength gets weak, and if the foaming proportion is too low, the time required for foaming gets longer to decrease productivity. Thus, considering these points, the foaming magnification must be selected.

A size of the injection foaming mold relative to the actual ball size is generally in the range of 0.9 to 0.6 times, and more preferably, 0.85 to 0.75 times.

(2) Material Compounding

Base polymer of the composition used in the present invention is based on EVA and the derivatives thereof, to which polyolefinic resin or elastomer, polystyrenic elastomer, natural rubber and synthetic rubber such as SBR, BR, NBR and IR may be blended.

The composition used in this invention contains a foaming agent, a crossliking agent and a dispersant in addition to the base polymer. Also, an inorganic filler may be added to the compound material.

As the foaming agent, an azodicarbonamide-based forming agent is typically used, and other materials such as sulfonyl hydrazide- and urea-foaming agents may also be used.

As the crosslinking agent, peroxide type is commonly used and, as a disperant, steric acid and waxes are used.

As the inorganic filler, $CaCO_3$, $MgCO_3$ or mica, etc. can be used.

The compound material used in according to this invention is dispersed uniformly by using a kneader, a banbury mixer and a single- or twin-screw extruder, and is made into the form of palletized chips such that it can be used in an injection machine.

(3) Injection Working

The mold made to have a proper magnification is mounted on an injection press, and the compound material was transferred into an injector cylinder, thereby performing the injection working.

In the injection working, the machine is operated at properly set press temperature and cure time, and the working can be executed manually or automatically.

After curing for a desired period of time at the set press conditions, the mold is opened to obtain the circular game ball. At this time, the obtained ball gets inflated as much as the foaming gas gets inflated, but it shrinks as the ball is cooled, and the size of the ball product is determined when it is completely cooled.

Since uniform cooling of the foamed ball can result in the uniform size of the ball, and the working with the cooling chamber installed is preferred.

Injection working conditions depend on properties of the compound material but general conditions are as follows:

injector temperature: 80-100° C.

press plate temperature: 150-190° C.

curing time: 400-2000 seconds cooling: 40° C. for 10 to 30 minutes

While the method for manufacturing the game ball by injection press foaming has been described, the method of the invention is not to be restricted by only the foaming through the injection machine and also can include the method that uses the material of the invention by a common steam press machine.

The method for manufacturing the game ball by the steam press machine bears the inferior precision and uniformity to the method for manufacturing the game ball by the injection machine but there is a merit that installation cost of machine is cheap.

The method for manufacturing the game ball according to the invention can produce the ball with a variety of hardness depending on the material and proper ball can be selected and used in accordance with the age of player.

Preferred examples in accordance with the present invention will now be described.

EXAMPLE 1

After the composition of table 1 that uses EVA as a base resin is kneaded in a kneader, an extruded palletized compound is produced using an extruder.

A mold is made by reducing its size to a size of 0.85 times the actual ball, and the injection foaming process is performed in the condition mentioned below, thereby obtaining an integral ball in one shot.

press temperature: 180° C.

cure time: 100 sec cooling: 40° C.×20 minutes mold diameter: 62 m/min

The obtained ball is 74 cm in diameter, 60 in hardness shore A, 147 g in weight, 40% in resilience and shows the same appearance as the conventional baseball. Also, the safety characteristic of the ball is superior when the ball hits on the body, compared to conventional baseball.

EXAMPLE 2

With the composition of table 1 that uses polyethylene resin and EVA resin, a ball was produced in the same method as that of example 1.

The obtained ball is 74 cm in diameter, 80 in hardness shore A, 147 g in weight, 38% in resilience and is harder than the ball of example 1.

TABLE 1

Composition of game ball

| Chemicals | Example 1 | Example 2 |
|---|---|---|
| EVA (VA 21%) | 100 | 70 |
| Polyethylene | — | 30 |
| Stearic acid | 1.0 | — |
| Polyethylene wax | — | 1.0 |
| DCP | 1.4 | 1.5 |
| Azodicarbonamide | 3.8 | 4.5 |

INDUSTRIAL APPLICABILITY

As described above, the invention provides the process of manufacturing a game ball wherein products with the same appearance as the conventional baseball can be obtained in one shot by injection press foaming of the material of EVA alone or blends thereof. Accordingly, the process can decrease a danger of the ball currently used in the Little League greatly and provide a process of producing the game ball for child, exercise and toy that displays the uniform circular form and playing characteristics and has the high productivity and therefore, is very is useful invention.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A method of manufacturing a game ball, in which the game ball is molded in one shot by injection press foaming of a compounded material comprising EVA alone or blends thereof, the method comprising the steps of:

providing a mold for use in injection press foaming, which has a size of 0.85-0.75 times the size of the game ball, compounding EVA alone or blends thereof as base polymer with an azodicarbonamide, sulfonyl hydrazide- or urea-based foaming agent, a peroxide-type crosslinking agent, a dispersant of stearic acid or wax, and an inorganic filler selected from the group consisting of $CaCO_3$, $MgCO_3$ and mica, so as to be uniformly dispersed;

mounting the mold on an injection press;

transferring the compounded material into an injector cylinder of the injection press;

performing injection molding of the compounded material on the injection press at an injector temperature of about 80-100° C., a press plate temperature of about 150-190° C. and a curing time of about 400-2000 seconds; and cooling the injection-molded material for about 10-30 minutes at about 40° C., thereby manufacturing a game ball.

2. The method of claim 1, in which the base polymer is based on EVA and derivatives thereof, to which at least one selected from the group of polyolefinic resin or elastomer, polystyrenic elastomer, natural rubber and synthetic rubber such as SBR, BR, NBR, IR is blended.

* * * * *